(12) United States Patent
Tanaka (10) Patent No.: US 7,701,939 B2
(45) Date of Patent: Apr. 20, 2010

(54) OPTICAL ACCESS NETWORK SYSTEM AND MULTICAST COMMUNICATION METHOD THEREOF

(75) Inventor: Masashi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 885 days.

(21) Appl. No.: 11/495,337

(22) Filed: Jul. 28, 2006

(65) Prior Publication Data

US 2007/0025352 A1 Feb. 1, 2007

(30) Foreign Application Priority Data

Jul. 29, 2005 (JP) .............................. 2005-221595

(51) Int. Cl.
H04L 12/56 (2006.01)

(52) U.S. Cl. .................. 370/390; 370/394; 370/401; 370/537

(58) Field of Classification Search ................ 370/389, 370/390, 394, 398, 395.31, 401, 537
See application file for complete search history.

(56) References Cited

U.S. PATENT DOCUMENTS

| | | | |
|---|---|---|---|
| 7,230,926 B2 * | 6/2007 | Sutherland et al. .......... | 370/241 |
| 2002/0039366 A1 * | 4/2002 | Sano ......................... | 370/390 |
| 2005/0100036 A1 * | 5/2005 | Davis ......................... | 370/432 |
| 2005/0135365 A1 * | 6/2005 | Sung et al. ................... | 370/390 |
| 2006/0013139 A1 * | 1/2006 | Koch et al. ................... | 370/236 |
| 2006/0013247 A1 * | 1/2006 | Koch et al. ................... | 370/437 |
| 2006/0018335 A1 * | 1/2006 | Koch et al. ................... | 370/432 |

FOREIGN PATENT DOCUMENTS

| | | |
|---|---|---|
| JP | 2004-214758 | 7/2004 |
| JP | 2004-343243 | 12/2004 |

* cited by examiner

*Primary Examiner*—Jayanti K Patel
*Assistant Examiner*—Bo Hui A Zhu
(74) *Attorney, Agent, or Firm*—Scully, Scott, Murphy & Presser, P.C.

(57) ABSTRACT

An OLT (Optical Line Terminal) having a multicast control unit, which controls connections dedicated for the multicast services, and a plurality of PON (Passive Optical Network) interfaces for accommodating subscriber terminals and each PON interface is provided with a unicast dedicated port for the unicast communication. When the multicast data packets are received at the multicast control unit, it identifies every PON interfaces as distribution destinations of those packets with referring to a pre-defined table and distributes first copied packets to respective identified PON interfaces. In each PON interface, it identifies every subscriber terminals as transmission destinations of the distributed multicast data packets with referring to another pre-defined table, and the second copied multicast data packets are multiplexed with the unicast data packets and transmitted to the subscriber terminals.

16 Claims, 9 Drawing Sheets

| MULTICAST ADDRESS (IP GROUP ADDRESS) | MULTICAST GROUP IDENTIFIER |
|---|---|
| xxx. xxx. xxx. xxx | 001 |
| yyy. yyy. yyy. yyy | 002 |
| zzz. zzz. zzz. zzz | 003 |
| ⋮ | ⋮ |

(MULTICAST MANAGEMENT TABLE)

FIG.3

| CARD NUMBER 281 | ONU NUMBER 282 | ONU MAC ADDRESS 283 | LOGICAL LINK IDENTIFIER 284 | MULTICAST GROUP IDENTIFIER 285 | |
|---|---|---|---|---|---|
| 1 | A | mac_a | L1 | 001 | |
| 1 | B | mac_b | L2 | 002 | |
| 1 | C | mac_c | L3 | 002 | |
| 1 | ⋮ | ⋮ | ⋮ | ⋮ | |
| 2 | D | mac_d | L4 | 002 | |
| 2 | E | mac_e | L5 | 003 | |
| 2 | ⋮ | ⋮ | ⋮ | ⋮ | |
| M | AA | mac_aa | L6 | 003 | |
| M | BB | mac_bb | L7 | 001 | |
| M | CC | mac_cc | L8 | 004 | |
| ⋮ | ⋮ | ⋮ | ⋮ | ⋮ | |
| N | N | mac_N | n1 | 001 | |
| N | N | mac_N | n2 | 003 | |
| ○ | | | | ○ | MC CONTROL BOARD FILTER INFORMATION 286 |
| | ○ | ○ | ○ | ○ | PON I/F BOARD FILTER INFORMATION 287 |

(FILTER INFORMATION TABLE) 258

OPTICAL ACCESS NETWORK SYSTEM AND MULTICAST COMMUNICATION METHOD THEREOF

BACKGROUND OF THE INVENTION

1. Field of the Invention

The present invention relates to an optical access network system and a multicast communication method thereof, and more particularly to an OLT (Optical Line Terminal) provided as a center side network element in an optical access network system and a multicast communication method to be used in the optical access network system in which the quality of multicast service is improved.

2. Description of the Related Art

An xDSL (x-Digital Subscriber Line) is the generic term of ADSL (Asymmetric Digital Subscriber Line), HDSL (High-bit-rate DSL), RADSL (Rate-Adaptive DSL), SDSL (Symmetric DSL) and VDSL (Very-high-bit-rate DSL). This xDSL is a modem technology allowing for the high-speed packet communications at several tens Megabits/sec at maximum, using the existing Subscriber Line (ordinary telephone cable made of copper wire) as a transmission line. Due to the introduction of communication services employing the xDSL, a high-speed and always-connected internet access network has become popular and widely spread.

However, as the xDSL technology involves the packet communication using the telephone cable, it has a problem that the transmission characteristics and the data transmission speed are affected by the length of the telephone cable, the characteristics of the telephone cable, and the peripheral environmental conditions of wiring path of the telephone cable from a telephone switching office to the subscriber's premises.

Thus, an access network using the optical technologies has been widely spreading, instead of the access network using the xDSL technology. The access network using the optical technologies is an optical access network so called an EPON (Ethernet Passive Optical Network) which employs the Ethernet technologies and realizes the packet communication through an optical cable connected to the subscriber's premises. The PON technology is recommended in the IEEE (The Institute of Electrical and Electronics Engineers, Inc.) 802.3ah.

The optical access network by the EPON is composed of an OLT (Optical Line Terminal) that is installed in the switching center of a communication common carrier as a center side network element, and an ONU (Optical Network Unit) that is installed in the subscriber's premises as a subscriber side network terminal. This optical access network is constructed by laying one optical fiber cable to an area in which plural subscribers' premises are locating, connecting a splitter as an optical coupler to the optical fiber cable for branching an optical path into a plurality of optical paths, and connecting each of branched optical cables to respective subscriber's premises. The optical access network can provide the user with the packet communications of wider band and higher quality than the access network with the metallic cable such as the telephone cable. Particularly, the optical access network is most suitable for an application such as the moving picture contents distribution services.

In the moving picture contents distribution services, a relatively large amount of data is transmitted in real time to a plurality of users. Therefore, from the viewpoint of efficiently using the network, the multicast services which perform the Point-to-Multipoint communications are suitable for the application such as the image distribution services. The services which have been widely spreading as the multicast services are the services implemented by the IP (Internet Protocol) communications. In an IPv4 (Internet Protocol version 4), a router takes control of whether or not there is any host participating in the multicast services on a subnet, using an IGMP (Internet Group Management Protocol: Version 1 and Version 2). In an IPv6 (Internet Protocol version 6), there is an MLD (Multicast Listener Discovery) that is a multicast group management protocol for use between the router and the host. The IGMP or MLD is the protocol for managing and controlling the IP multicast group, and used by a multicast router supporting the multicast services and the client terminals receiving the multicast data.

In Japanese Patent Laid-Open No. 2004-343243, a protocol for implementing the multicast through the IP communications is disclosed. Herein, the multicast router periodically multicasts a Query message packet representing a processing request as a character string to the terminals. The terminal having received this Query message packet returns a Report message packet to the multicast router. This Report message packet contains the multicast address of the multicast group in which the terminal participates.

The multicast router having received the Report message packet recognizes the terminal which declares a participation intention in the multicast group, and reflects the information of the Report message packet to the routing process. Thereby, the multicast data packet is distributed to a plurality of terminals from the multicast router.

On the other hand, when a terminal wants to leave from the multicast group in which it participates, it transmits a Leave message packet. The multicast router having received the Leave message packet stops distributing the multicast data packet to the terminal declaring the leave intention.

In the above disclosed technology, the multicast service is provided in accordance with the above protocol procedures. Further, the multicast service is realized, without providing the functional blocks of routing on the subscriber side, by snooping (monitoring) each protocol packet when multicasting and performing a logical link control in conjunction with the snooped result.

Also, in Japanese Patent Laid-Open No. 2004-214758, a communication system is proposed in which the multicast data packet is distributed to each terminal, regardless of the number of multicast distribution destinations, without copying it by the number of distribution destinations.

Figure 8:
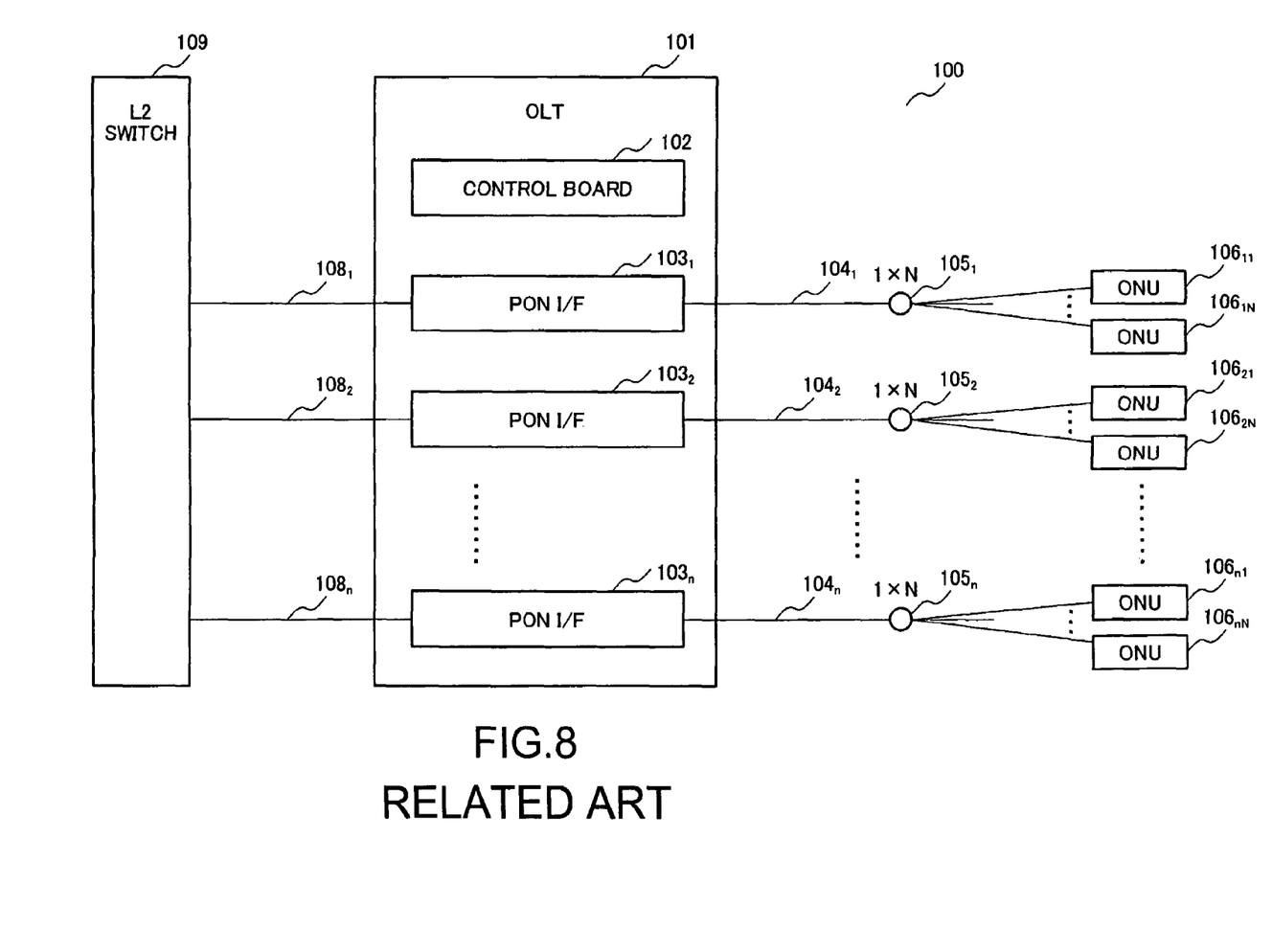
FIG. 8 is a system block diagram representing the essence of the conventional typical optical access network system.

FIG. 8 is a system block diagram representing the essence of the conventional typical optical access network system. An OLT (Optical Line Terminal) 101 as a center side network element in the conventional optical access network system 100 comprises a control board 102 for controlling the entire apparatus, and a plurality of PON interface boards (PON I/F) $103_1$, $103_2$, . . . and $103_n$. This conventional optical access network system 100 with the OLT 101 is composed of a subscriber side network terminal portion and a network side apparatus portion. The subscriber side network terminal portion comprises the optical fiber cables $104_1$, $104_2$, . . . and $104_n$ connecting to the respective PON interface boards $103_1$, $103_2$, . . . and $103_n$, the 1×N splitters $105_1$, $105_2$, . . . and $105_n$ for splitting the optical fiber cables $104_1$, $104_2$, . . . and $104_n$ into n×N optical paths corresponding to subscribers, not shown, and a plurality of ONUs (Optical Network Units), as the subscriber side network terminal, $106_{11}$ to $106_{1N}$, $106_{21}$ to $106_{2N}$, . . . and $106_{n1}$ to $106_{nN}$ connected to the respective optical paths branched by 1×N splitters $105_1$, $105_2$, . . . and $105_n$. And the network side apparatus portion is configured such that the SNI (Service Node Interface) ports $108_1$, $108_2$, . . . and $108_n$, which are interface ports to the network side on the PON interface boards $103_1$, $103_2$, ... and $103_n$ of the OLT 101, are connected to an L2 switch 109.

The conventional OLT 101 is configured such that an SNI port 108, which is connected to the L2 switch 109 as a part of the network (not shown), is provided for each PON interface board 103. Accordingly, when the OLT 101 accommodates the PON interface boards $103_1$, $103_2$, ... and $103_n$, the respective SNI ports $108_1$, $108_2$, ... and $108_n$ are connected to the L2 switch 109, for example. And these n SNI ports $108_1$, $108_2$, ... and $108_n$ assure the connection of respective PON interfaces with the network.

Figure 9:
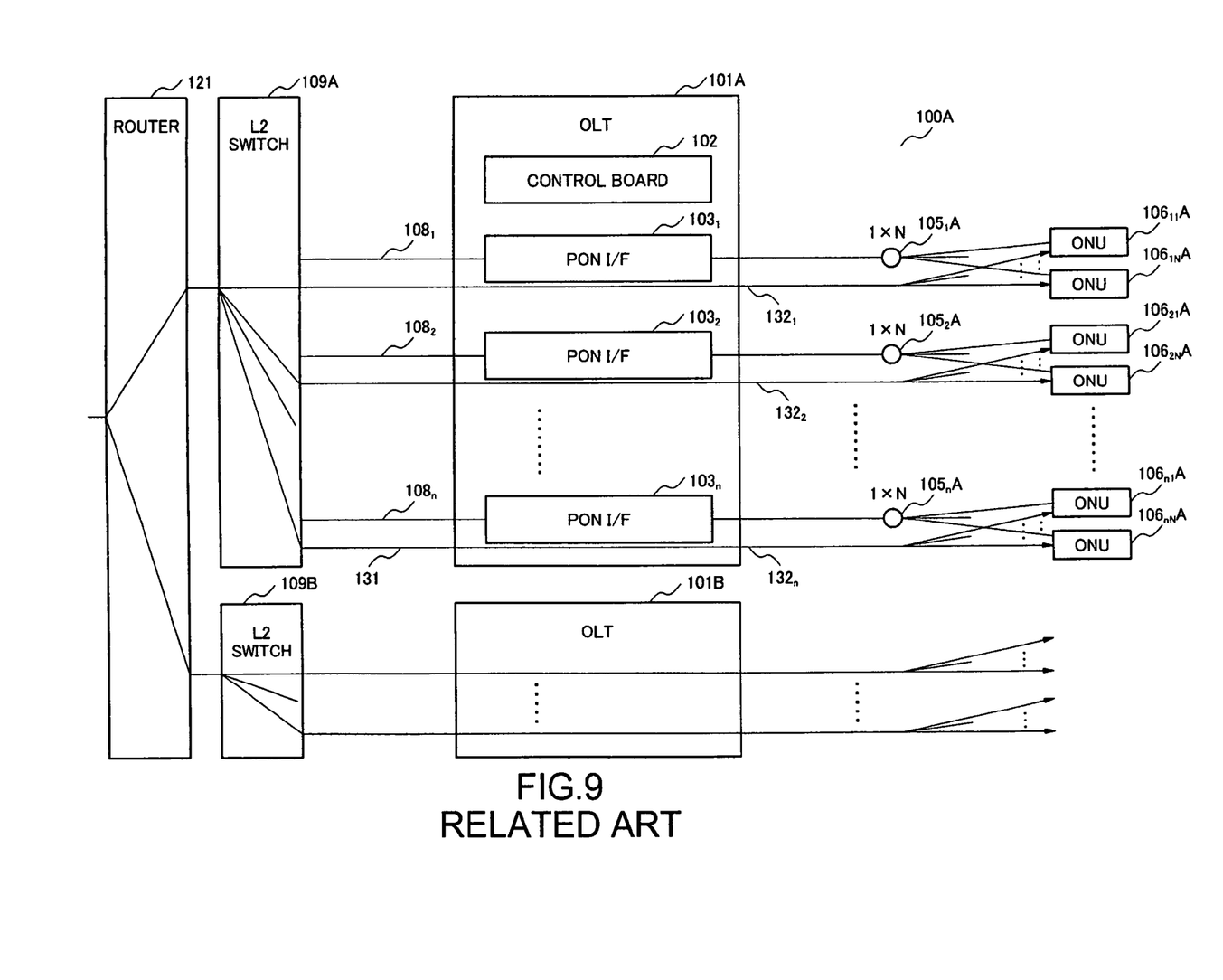
FIG. 9 is a system block diagram representing how to transfer the multicast data in the conventional optical access network system.

FIG. 9 is a system block diagram representing how to transfer the multicast data in the conventional optical access network system. The same parts are given the same numerals throughout FIGS. 8 and 9, and the explanation of the same parts is omitted properly.

In FIG. 9, a router 121 and the first and second L2 switches form a part of the network to which the optical access network system 100A is to be connected, and a router 121 is connected to the first and second L2 switches 109A and 109B. The first L2 switch 109A is connected via the first OLT 101A and the 1×N splitters $105_1A$, $105_2A$, ... and $105_nA$ to a plurality of ONUs $106_{11}A$ to $106_{1N}A$, $106_{21}A$ to $106_{2N}A$, ... and $106_{11}A$ to $106_{nN}A$. The circuit configuration of first OLT 101A and each of ONUs $106_{n1}A$ to $106_{1N}A$, $106_{21}A$ to $106_{2N}A$, ... and $106_{n1}A$ to $106_{nN}A$ is the same as that of shown in FIG. 8 respectively. The circuit portion of the second L2 switch 109B, the second OLT 101B and the equipment connected to the second OLT 101B is substantially the same as the circuit portion of the first L2 switch 109A, the first OLT 101A and each of ONUs, and the illustration and explanation of this circuit portion are omitted properly.

In FIG. 9, the router 121 distributes a multicast data packet to both of the first and second L2 switches 109A and 109B. The first L2 switch 109A is representatively explained below.

The first L2 switch 109A copies and distributes the multicast data packet as indicated by line 131 to the respective SNI ports $108_1$, $108_2$, ... and $108_n$ of the first OLT 101A. Each of the PON interface boards $103_1$, $103_2$, ... and $103_n$ distributes the multicast data packet received from the corresponding SNI port $108_1$, $108_2$, ... or $108_n$ to the respective ONUs $106_{11}$ to $106_{1N}$, $106_{21}$ to $106_{2N}$, ... and $106_{n1}$ to $106_{nN}$ as indicated by the lines $132_1$ to $132_n$.

With the conventional multicast communication method as described in Japanese Patent Laid-Open No. 2004-343243 or Japanese Patent Laid-Open No. 2004-214758, there is a problem that the multicast data packet has a deleterious effect on the communication band and communication quality for non-multicast data packets in the PON section between the OLT 101 in FIG. 8 and the plurality of ONU $106_{11}$ to $106_{1N}$, $106_{21}$ to $106_{2N}$, ... and $106_{n1}$ to $106_{nN}$, for example.

This is caused by broadcasting the multicast data packets between the OLT 101 and each of the plurality of ONU $106_{11}$ to $106_{1N}$, $106_{21}$ to $106_{2N}$, and $106_{n1}$ to $106_{nN}$ with the conventional technologies as described in Japanese Patent Laid-Open No. 2004-343243 or Japanese Patent Laid-Open No. 2004-214758. That is, all the multicast data packets transmitted by each of the PON interface boards $103_1$, $103_2$, ... and $103_n$ are broadcasted and distributed to all the subscribers in the same PON section. Therefore, the multicast data packets arrive at all the subscriber terminals. Accordingly, the subscriber terminal, not shown, makes a filtering process of taking in only the corresponding data packet addressed to the self-terminal, and discarding other data.

Owing to the features of the PON section, the data packet other than the multicast packet (hereinafter referred to as a unicast data packet) is also broadcasted like the multicast data packet. Therefore, each subscriber terminal discards the data packets not addressed to itself through the filtering process. Then, if a number of subscribers accommodated in the PON interface board 103 of the OLT 101 each participate in different multicast groups, the multicast data distributed to the PON section increases in proportion to the number of multicast groups. As a result, there is a problem that the communication band for non-multicast data packets is oppressed.

A second problem is that the multicast data packets have a deleterious effect on the communication band and communication quality for the unicast data packets in the SNI ports $108_1$, $108_2$, ... and $108_n$. This is because if a number of subscribers accommodated in the PON interface board 103 of the OLT 101 participate in the different multicast groups, the number of multicast data packets distributed from the L2 switch 109 to the SNI ports 108 proportionally increases, so that the communication band for the unicast data packets is oppressed.

A third problem is that the load on the L2 switch 109, to which the optical access network system 100 is connected, increases, and it causes to impose a limitation or deterioration on the data band or quality of the provided multicast data services.

The reason is as follows. That is, in the conventional OLT 101, the multicast data packets or unicast data packets are processed in non-concentration manner which performs packet processing individually by each of the PON interface boards $103_1$, $103_2$, ... and $103_n$. Therefore, there is a problem that the L2 switch 109 connected with the plurality of the SNI ports $108_1$ to $108_n$ in the OLT 101 has to copy and distribute the multicast data packets by the number of SNI ports $108_1$, $108_2$, ... and $108_n$. As the data band and quality of multicast services depend on the processing performance of the L2 switch 109, an excessive load of the L2 switch 109 causes to impose limitations regarding the multicast service expansion over the optical access network system, or it causes to deteriorate the quality of multicast services.

SUMMARY OF THE INVENTION

An exemplary feature of the present invention is to provide an OLT (Optical Line Terminal) as a center side network element in an optical access network system for implementing the multicast services without having a deleterious effect on the communication band and the communication quality for unicast data packets, and a multicast communication method to be used in the optical access network system.

The OLT, according to the present invention, comprises a multicast control unit and a plurality of packet data transmission and reception control units. The multicast control unit is provided with a multicast communication dedicated port connected to the network for multicast communication services. The packet data transmission and reception control unit accommodates a plurality of subscriber terminals, and provided with a unicast communication dedicated port connected to the network for unicast communication services.

The multicast control unit comprises a first distribution control section. When the multicast data packets are received at the multicast control unit, the first distribution control section identifies every packet data transmission and reception control units necessary for distributing the multicast data packets with referring to a first pre-defined table, and distributes the multicast data packets to the respective identified packet data transmission and reception control units.

The packet data transmission and reception control unit comprises a second distribution control section. When the multicast data packets are distributed from the multicast control unit, the second distribution control section identifies every subscriber terminals necessary for transmitting the multicast data packets with referring to a second pre-defined table, multiplexes the multicast data packets with unicast data packets received via the unicast communication dedicated port, and transmits the multiplexed data packets to the subscriber terminals.

The multicast communication method according to the present invention comprises the following steps.

A receiving step for receiving the multicast data packet at the multicast control unit via the multicast communication dedicated port connected to the network, a first distributing step, which identifies every packet data transmission and reception control units necessary for distributing the multicast data packet with referring to a first pre-defined table, and distributes the multicast data packets to the respective identified packet data transmission and reception control units, and a second distributing step, which receives the distributed multicast data packet at the packet data transmission and reception control unit, identifies every subscriber terminals necessary for transmitting the multicast data packets with referring to a second pre-defined table, multiplexes the multicast data packets with unicast data packets received from the network, and transmits the multiplexed data packets to the subscriber terminals.

With the above configuration, according to the present invention, the OLT receives and processes the multicast data packets separately from the unicast data packets, whereby it is possible to implement the multicast services without having a deleterious effect on the communication band and the communication quality for the unicast data packets.

BRIEF DESCRIPTION OF THE DRAWINGS

The above and other exemplary features, and advantages of the present invention will become more apparent from the following detailed description when taken in conjunction with the accompanying drawings wherein.

DETAILED DESCRIPTION OF THE EXEMPLARY EMBODIMENTS

The present invention will be described below based on the exemplary embodiments.

Exemplary Embodiment 1

Figure 1:
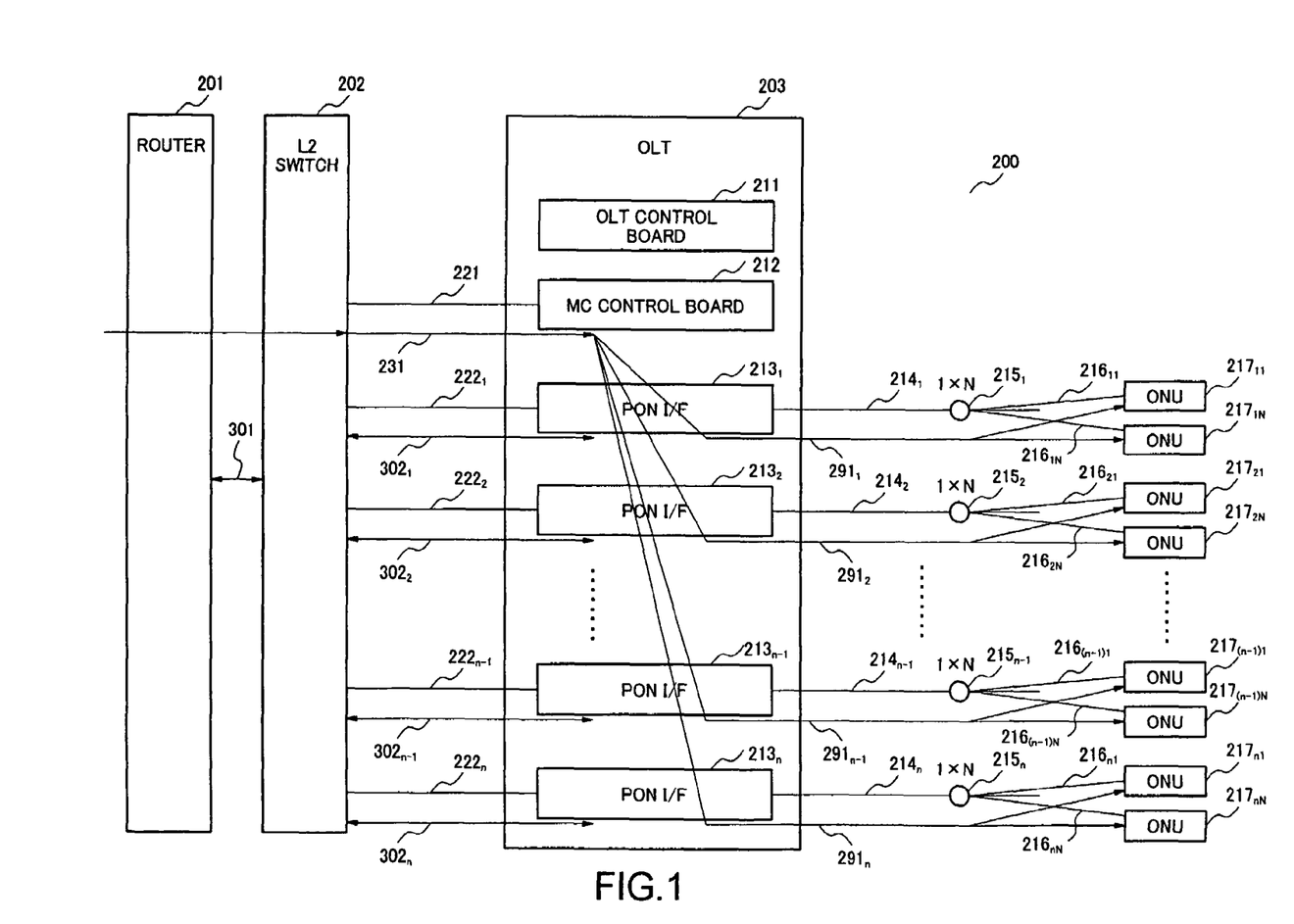
FIG. 1 is a system block diagram schematically representing the configuration of an optical access network system according to a first exemplary embodiment of the present invention.

FIG. 1 is a system block diagram schematically representing the configuration of an optical access network system according to a first embodiment of the present invention. The optical access network system 200 of this embodiment comprises an OLT (Optical Line Terminal) 203 as a center side network element which terminates data packets transmitted from a network (not shown), via a router 201 and an L2 (layer 2) switch 202. The OLT 203 comprises an OLT control board 211 for controlling the entire apparatus (OLT), a multicast (MC) control board 212 for controlling the multicast communications, and a plurality of PON interface boards (PON I/F) $213_1, 213_2, \ldots$ and $213_n$. One end of each optical fiber cable $214_1, 214_2, \ldots$ or $214_n$ is correspondingly connected to each PON interface board $213_1, 213_2, \ldots$ or $213_n$, and the other end of each optical fiber cable $214_1, 214_2, \ldots$ or $214_n$ is connected to the multiplex side of corresponding 1×N splitter $215_1, 215_2, \ldots$ or $215_n$. The 1×N splitter $215_1, 215_2, \ldots$ or $215_n$ is a splitter which splits one optical path to a plurality of N optical paths, and one ends of N optical fiber cables $216_{11}$ to $216_{1N}, 216_{21}$ to $216_{2N}, \ldots$ or $216_{n1}$ to $216_{nN}$ are connected to the branch side thereof. A plurality of N ONUs (Optical Network Units) as subscriber side network terminals $217_{11}$ to $217_{1N}, 217_{21}$ to $217_{2N}, \ldots$ or $217_{n1}$ to $217_{nN}$ are correspondingly connected to the other ends of the optical fiber cables $216_{11}$ to $216_{1N}, 216_{21}$ to $216_{2N}, \ldots$ or $216_{11}$ to $216_{nN}$.

Herein, the optical access network system 200 is composed of a subscriber side network terminal portion and a network side apparatus portion. The subscriber side network terminal portion comprises the PON interface boards $213_1, 213_2, \ldots$ and $213_n$ of the OLT 203, the optical fiber cables $214_1, 214_2, \ldots$ and $214_n$, the 1×N splitters $215_1, 215_2, \ldots$ and $215_n$, the optical fiber cables $216_{11}$ to $216_{1N}, 216_{21}$ to $216_{2N}, \ldots$ and $216_{n1}$ to $216_{nN}$, and a plurality of ONUs $217_{11}$ to $217_{1N}, 217_{21}$ to $217_{2N}, \ldots$ and $217_{n1}$ to $217_{nN}$.

Also, the network side apparatus portion is configured such that an SNI port 221 that is the interface on the network side of the multicast control board 212, and the SNI ports $222_1, 222_2, \ldots$ and $222_n$ that are the interfaces on the network side of the PON interface boards $213_1, 213_2, \ldots$ and $213_n$. Those SNI ports $221, 222_1, 222_2, \ldots$ and $222_n$ are connected to an L2 switch 202, and the L2 switch 202 is connected to the router 201 of multicast router through a path 301. Here, the L2 switch 202 and the router 201 are a part of the network.

Though not shown in FIG. 1, an STB (Set Top Box) with a television or personal computer for receiving the multicast services, or a subscriber terminal such as a VoIP (Voice over IP) service terminal is connected to the respective ONUs $217_{11}$ to $217_{1N}, 217_{21}$ to $217_{2N}, \ldots$ and $217_{n1}$ to $217_{nN}$. In FIG. 1, the optical fiber cables $214_1, 214_2, \ldots$ and $214_n$, the 1×N splitters $215_1, 215_2, \ldots$ and $215_n$, the optical fiber cables $216_{11}$ to $216_{1N}, 216_{21}$ to $216_{2N}, \ldots$ and $216_{n1}$ to $216_{nN}$ are generally referred to as a PON section for the convenience of explanation. The Optical access network system 200 of this embodiment is configured as assuming a GEPON (Gigabit Ethernet Passive Optical Network) system.

Figure 2:
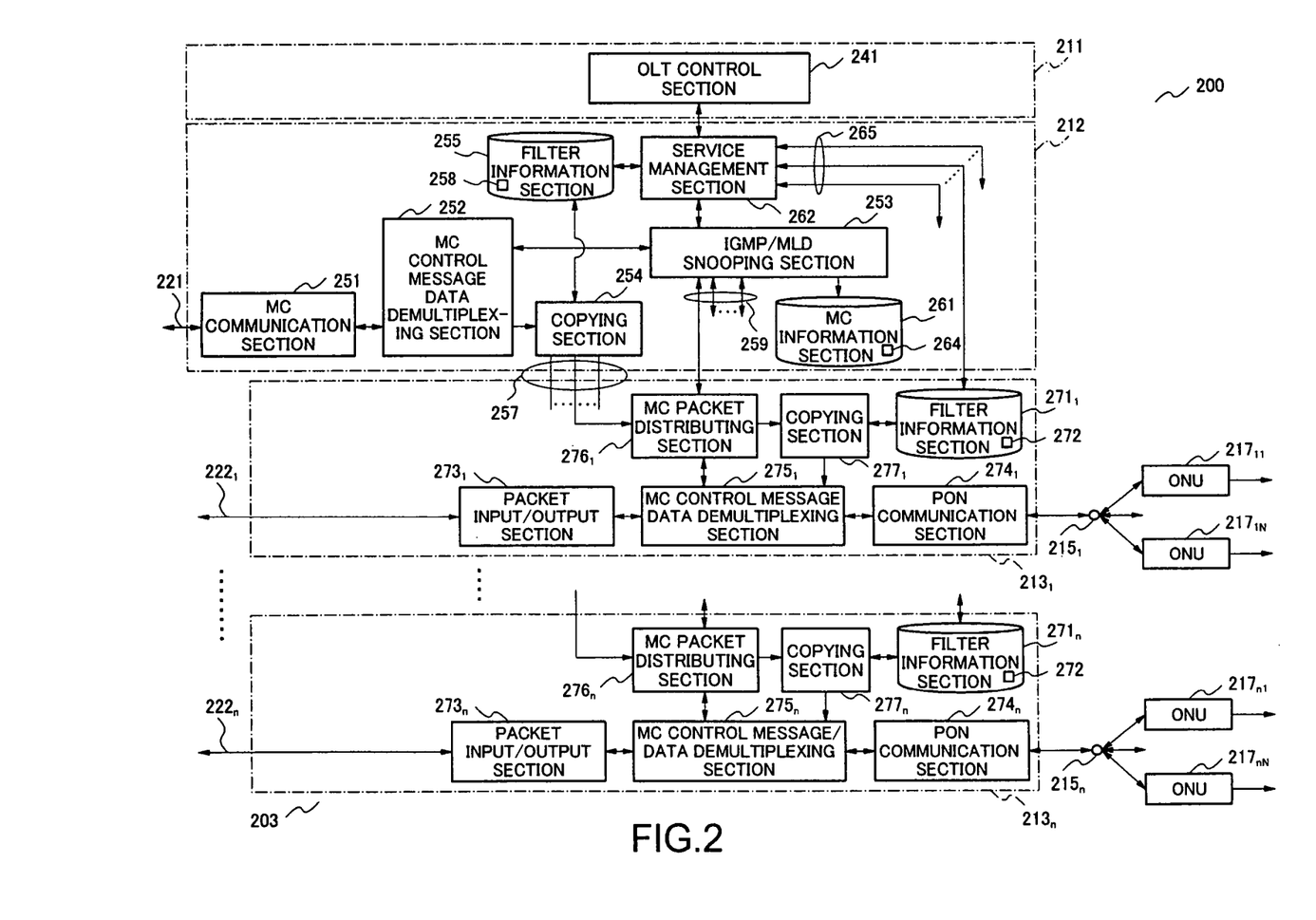
FIG. 2 is a block diagram representing the specific configuration of an OLT and its peripherals according to the embodiment.

FIG. 2 is a block diagram representing the specific configuration of the OLT and its peripherals according to the embodiment. The OLT control board 211 of the OLT 203 comprises an OLT control section 241. The OLT control section 241 has a CPU (Central Processing Unit), not shown, and a memory having a working memory area for temporarily storing various kinds of data in executing a control program, as well as storing the control program executed by the CPU.

The multicast control board 212 has a multicast communication section 251 connected to the SNI port 221. The multicast communication section 251 receives multicast data packets from the network, or transmitting and receiving multicast control message packets used for controlling the IP multicast group.

An MC control message/data demultiplexing section 252 demultiplexes the data received from the multicast communication section 251 into a multicast control message packet and a multicast data packet. Then the multicast control message packet is transferred to an IGMP/MLD snooping section 253, and the multicast data packet is transferred to a copying section 254. Also, the MC control message/data demultiplexing section 252 receives the multicast control message packet from the IGMP/MLD snooping section 253. The MC control message/data demultiplexing section 252 transfers this received multicast control message packet to the MC communication section 251.

On the other hand, if the copying section 254 receives the multicast data packet from the MC control message/data demultiplexing section 252, it copies this multicast data packet to the corresponding one of the PON interface boards $213_1, 213_2, \ldots$ and $213_n$ by referring to a filter information section 255, and distributes it inside the apparatus via an intra-apparatus multicast data path 257.

The filter information section 255 stores a filter information table 258. The filter information table 258 is including the information regarding the copying process of the multicast data packet, as will be specifically described later. Also, a multicast information section 261 stores a multicast management table 264. The multicast management table 264 is including the distributing information for the multicast service by the OLT 203, as will be specifically described later.

The IGMP/MLD snooping section 253 analyzes a multicast control message packet received via an intra-apparatus multicast control message path 259 from each of the PON interface boards $213_1, 213_2, \ldots$ and $213_n$ or the network, and updates the data of the multicast information section 261 and notifies its result to a service management section 262 at the same time. The multicast control message packet is the multicast control message packet of IGMP or MLD that is the protocol used for controlling the IP multicast group.

The service management section 262 updates the filter information table 258 of the filter information section 255 and updates the filter information tables 272 of the filter information section $271_1$ to $271_n$ in the PON interface boards $213_1, 213_2, \ldots$ and $213_n$ via an intra-apparatus filter information control path 265 by reflecting the multicast service information received from the IGMP/MLD snooping section 253.

Each of the PON interface boards $213_1, 213_2, \ldots$ and $213_n$ has the same circuit configuration. Thus, the circuit configuration will be described below, using the PON interface board $213_n$ representatively. The PON interface board $213_n$ comprises, in addition to the filter information section $271_n$ described above, a packet input/output section $273_n$, a PON communication section $274_n$, an MC control message/data demultiplexing section $275_n$, an MC packet distributing section $276_n$ and a copying section $277_n$. The packet input/output section $273_n$ communicates the unicast data packet with the network via the SNI port $222_n$. The PON communication section $274_n$ performs the data communications, in conformity with the IEEE802.3ah, with the ONU $217_{n1}$ to $217_{nN}$ connected via the PON section.

The filter information section $271_n$ has the filter information table 272 updated by the service management section 262 of the multicast control board 212. Also, the MC control message/data demultiplexing section $275_n$ demultiplexes the packet into the multicast control message packet and the multicast data packet and the unicast data packet. The multicast control message packet and the multicast data packet are transmitted or received via the multicast control board 212 between the network and the subscriber, and the unicast data packet is transmitted or received between the network and the subscriber via the SNI port $222_n$ by the packet input/output section $273_n$.

The MC packet distributing section $276_n$ has the following three functions. A first function is to transfer a multicast data packet which is received from the multicast control board 212 via the intra-apparatus multicast data path 257 to the copying section $277_n$. A second function is to transfer a multicast control message packet which is received via the intra-apparatus multicast control message path 259 of the multicast control board 212 to the MC control message/data demultiplexing section $275_n$. A third function is to transfer the multicast control message packet inputted from the MC control message/data demultiplexing section $275_n$ via the intra-apparatus multicast control message path 259 to the multicast control board 212. The copying section $277_n$ copies the multicast data packet received from the MC packet distributing section $276_n$ in accordance with the contents of the filter information section 271 and distributes the copied result to each subscriber.

Figure 3:
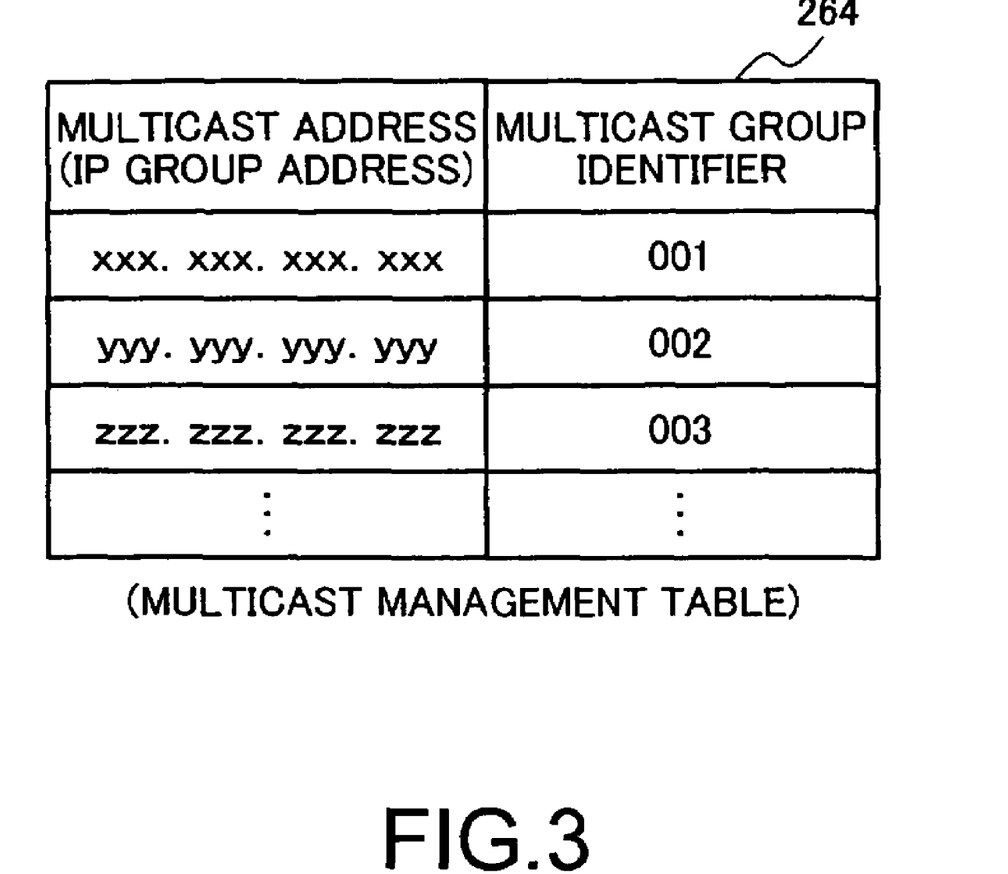
FIG. 3 is an explanatory view showing a multicast management table structure according to the embodiment.

FIG. 3 is an explanatory view showing a multicast management table structure. The multicast management table 264 has a multicast address, namely, an IP group address, and a multicast group identifier associatively. This multicast management table 264 is stored in the multicast information section 261 in the multicast control board 212, and used by the OLT 203 to control the distribution of multicast service.

Figure 4:
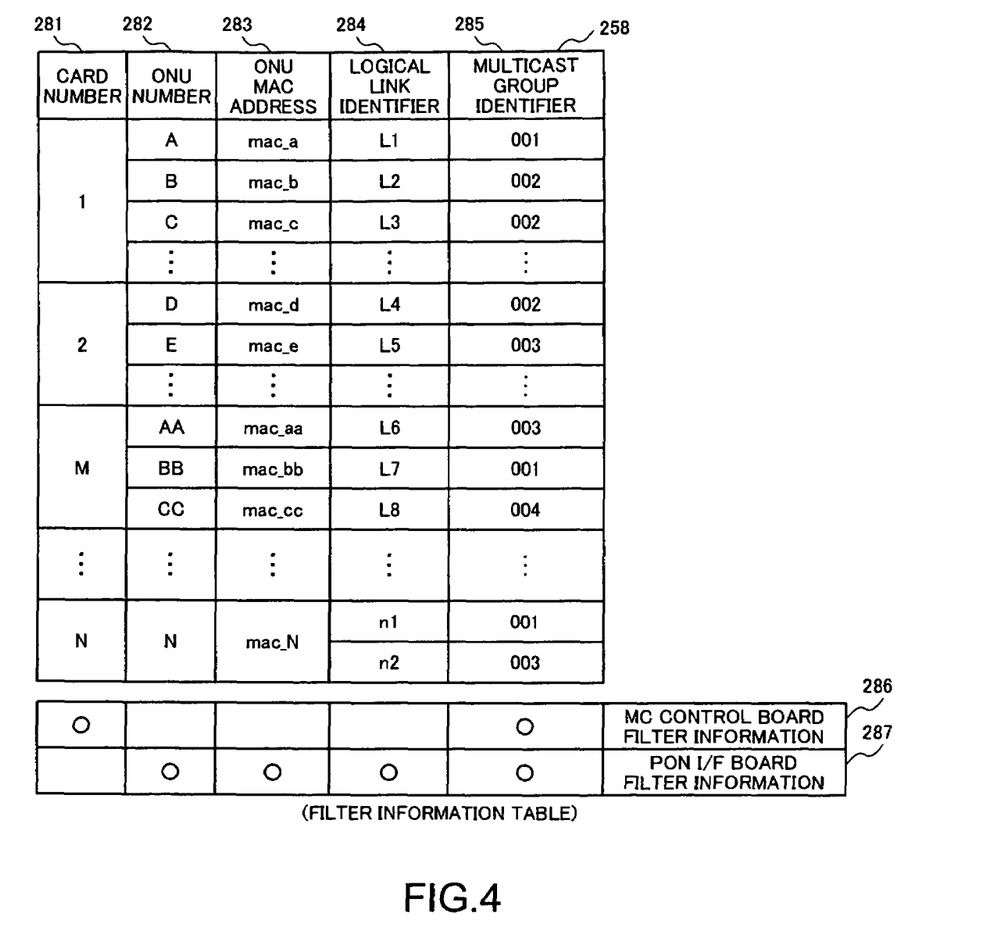
FIG. 4 is an explanatory view showing a filter information table structure according to the embodiment.

FIG. 4 is a view showing a filter information table structure. The filter information table 258 is stored in the filter information section 255 in the multicast control board 212 and has the information regarding the copying process for the multicast data packet as will be described later. This filter information table 258 comprises a card number 281, an ONU number 282, an ONU MAC (Media Access Control) address 283, a logical link identifier 284 and a multicast group identifier 285. Herein, the term "card" means each of the PON interface boards $213_1, 213_2, \ldots$ and $213_n$ mounted as the card on the OLT 203.

The operation of the optical access network system with the above configuration will be described below.

First of all, the operation where the subscriber participates in the multicast service will be described below. In this case, the PON communication section $274_n$ in the PON interface board $213_n$, shown in FIG. 2, corresponding to the subscriber receives a Report message packet from the subscriber. Subsequently, the PON communication section $274_n$ transfers the received Report message packet to the MC control message/data demultiplexing section $275_n$.

If receiving the Report message packet, the MC control message/data demultiplexing section $275_n$ recognizes it as the control message packet of the protocol used for controlling the IP multicast group, and transfers it to the MC packet distributing section $276_n$. The MC packet distributing section $276_n$ transfers the Report message packet to the IGMP/MLD snooping section 253 of the multicast control board 212. The IGMP/MLD snooping section 253 receives the Report message packet, and determines whether or not it is being already provided as the multicast service in its OLT 203 by referring to the multicast management table 264 (FIG. 3) of the multicast information section 261.

A case where the multicast group is unregistered in the multicast management table 264 as a result of the above determination will be described below.

The IGMP/MLD snooping section 253 registers the multicast address and the multicast group identifier in the multicast management table 264. Also, the IGMP/MLD snooping section 253 notifies the service management section 262 that the multicast management table 264 is updated because the subscriber participates in the multicast service. The service management section 262 updates the filter information table 258 of the filter information section 255, and updates the filter information section $271_n$ of the PON interface board $213_n$ via the intra-apparatus filter information control path 265. That is, for the subscriber newly participating in the multicast service, the card number 281, the ONU number 282, the ONU MAC (Media Access Control) address 283, the logical link identifier 284 and the multicast group identifier 285 are registered.

In the filter information table 258 as shown in FIG. 4, the ONU number 282, the ONU MAC address 283 and the logical link identifier 284 are associated with the operation of the PON communication section $274_n$ in conformity with the IEEE802.3ah, and these information are used by the OLT 203 for its controlling. In the optical access network system employing the EPON, the Point-to-Multipoint Ethernet connection between one OLT 203 and a plurality of ONUs $217_{11}$ to $217_{1N}$, $217_{21}$ to $217_{2N}$, ... and $217_{n1}$ to $217_{nN}$, as shown in FIG. 1, is established by using the LLID (Logical Link Identifier).

The logical link identifier 284 is incorporated with 2 bytes into the preamble of an MAC (Media Access Control) frame of the conventional Ethernet, and used in the PON section between the OLT 203 and each of the ONUs $217_{11}$ to $217_{1N}$, $217_{21}$ to $217_{2N}$, ... and $217_{n1}$ to $217_{nN}$. In the PON section, the splitter splits the transmitted light into N. Accordingly, the frame that the OLT 203 transmits to a certain ONU 217 is also received by other ONUs 217 in the same branch.

Thus, the ONU 217 compares it with the LLID assigned to itself by referring to the preamble of the flame transmitted from the OLT 203. As a result, if both are the same, the ONU 217 recognizes that the frame is addressed to itself, and the frame is to be received by the ONU 217. On the contrary, if the preamble of the frame transmitted from the OLT 203 is different from the LLID assigned to itself, that frame is discarded. In this way, the OLT 203 and the ONUs $217_{11}$ to $217_{1N}$, $217_{21}$ to $217_{2N}$, ... and $217_{n1}$ to $217_{nN}$ emulate the Point-to-Point communication, using the LLID.

The OLT 203 identifies the ONU 217 which is communicating based on the card number 281, the ONU number 282, the ONU MAC address 283 and the logical link identifier 284, and monitors and controls the subscriber.

The service management section 262 manages the filter information table 258 for identifying which subscriber participates in which multicast group by appending the multicast group identifier of the multicast group in which the subscriber participates to its information.

The multicast control board 212 has the information of all the items of the filter information table 258, in which each item is used in the following way to control the multicast service. That is, the card number 281 and the multicast group identifier 285 are referred to as the filter information in performing the copying process in the multicast control board 212, as will be described below. The ONU number 282, the ONU MAC address 283, the logical link identifier 284 and the multicast group identifier 285 are referred to as the filter information in performing the copying process in the PON interface board $213_n$, as will be described below. In FIG. 4, in the multicast control board filter information 286 or the PON interface board filter information 287, the applicable items are checked by round sign (○). And in the filter information section 271 of the PON interface board, the PON interface board filter information 287 corresponding to each PON interface board is stored in the filter information table 272.

The IGMP/MLD snooping section 253 transfers a Report message packet transmitted from the subscriber to the MC control message/data demultiplexing section 252. The MC control message/data demultiplexing section 252 enables the multicast communication section 251 to transmit this Report message packet to the network.

This Report message packet is received by the router 201 through the L2 switch 202 as shown in FIG. 1. The router 201 which is the multicast router starts to send out the multicast data packet based on that received Report message packet.

The multicast data packet sent out from the router 201 is transferred to the copying section 254 via the multicast communication section 251 and the MC control message/data demultiplexing section 252 in the multicast control board 212 within the OLT 203. The copying section 254 recognizes the received multicast data packet, and discriminates to which of the PON interface boards $213_1$, $213_2$, ... and $213_n$ the multicast data packet should be copied by referring to the filter information table 258 of the filter information section 255.

For example, it is supposed that the copying section 254 receives the multicast data packet corresponding to the multicast group identifier "001". In this case, the card number 281 in which the multicast group identifier 285 is "001" in the filter information table 258 as shown in FIG. 4 is acquired. In this example, the card numbers "1", "M" and "N" are acquired. Thus, the multicast data packet is copied for the card with the card number "1", "M" and "N", and the copied multicast data packet is sent to each card via the intra-apparatus multicast data path 257. For the card with the card number "2", the copying process for the card with the card number "2" is not performed because there is no subscriber participating in this multicast service.

Also, it is supposed that the copying section 254 receives the multicast data packet corresponding to the multicast group identifier "002". In this case, the copying process for the card with the card number "1" and "2" is performed, and the copied multicast data packet is sent via the intra-apparatus multicast data path 257. The copying process for the card with the card number "M" and "N" is not performed because there is no subscriber participating in this multicast service.

Similarly, when the multicast group identifier 285 is "003", the copying process for the card with the card number "2", "M" and "N" is performed, and the copied multicast data packet is sent via the intra-apparatus multicast data path 257. In this case, the copying process for the card with the card number "1" is not performed because there is no subscriber participating in this multicast service.

For the card number "1", there are two entries where the multicast group identifier 285 is "002". This means that there are two subscribers. However, since the copying process in the multicast control board 212 may be performed corresponding to each PON interface board 213, the number of copying processes by the copying section 254 does not increase even if a plurality of subscribers exist for the same card.

If the MC packet distributing section $276_n$ in the PON interface section $213_n$ receives a multicast data packet and recognizes the multicast data packet as data packet, it transfers the multicast data packet to the copying section $277_n$. The copying process in the PON interface board 213 is performed for each subscriber corresponding to the multicast group identifier of the multicast data packet. Thus, the copying section $277_n$ determines the subscriber having the logical link identifier corresponding to the multicast group identifier by referring to the filter information table 272 of the filter information section $271_n$ in the following way.

Referring to the filter information table for the card number "N" as shown in FIG. 4, for example, a multicast data packet in which the multicast group identifier 285 is "001" is copied for the subscriber in which the logical link identifier is "n1". Also, a multicast data packet in which the multicast group identifier 285 is "003" is copied for the subscriber in which the logical link identifier is "n2".

The copied multicast data is passed to the MC control message/data demultiplexing section $275_n$, multiplexed with the unicast data packet received via the packet input/output section 273, and distributed to the intended subscriber by the PON communication section $274_n$.

The PON communication section $274_n$ transmits the multicast data packet by appending the LLID as defined in IEEE802.3ah to the preamble of the frame of the copied multicast data packet. Further, a QoS (Quality of Service) process of the multicast data packet is assured by a QoS processing section, not shown.

Subsequently, a case where the subscriber transmitting a Report message packet belongs to the multicast group which is already registered in the multicast management table 264 will be described below.

The IGMP/MLD snooping section 253 does not transfer this Report message packet to the network, if it discriminates that the multicast group is registered by referring to the multicast management table 264. And the IGMP/MLD snooping section 253 notifies the service management section 262 that there is a participation request from the subscriber to the multicast group.

The service management section 262 updates the filter information section $271_n$ on the PON interface board $213_n$ via the intra-apparatus filter information control path 265. Thereby, the filter information tables 258, 272 on the multicast control board 212 and each PON interface board $213_n$ are updated, and the copying processes performed by the copying section 254 on the multicast control board and the copying section $277_n$ on the PON interface board are added. If there is any other subscriber already participating in the PON interface board $213_n$, the copying process performed by the multicast control board 212 is not added, and the number of copying destinations for the multicast data packet performed by the copying section $277_n$ of the PON interface board $213_n$ increases.

Next, a case where the subscriber leaves from the multicast group in which the subscriber participates will be described below.

In this case, the subscriber sends a Leave message packet. Then, the PON communication section $274_n$ of the PON interface board $213_n$ accommodating the subscriber receives the Leave message packet from the subscriber, and transfers it to the MC control message/data demultiplexing section $275_n$.

If the MC control message/data demultiplexing section $275_n$ receives the Leave message packet and recognizes it as the control message packet of the protocol used for controlling the IP multicast group, it transfers the control message packet to the MC packet distributing section $276_n$. The MC packet distributing section $276_n$ transfers the Leave message packet to the IGMP/MLD snooping section 253 of the multicast control board 212.

If the IGMP/MLD snooping section 253 receives the Leave message packet, it determines whether or not the multicast service is being provided by referring to the multicast management table 264 of the multicast information section 261. Further, the IGMP/MLD snooping section 253 inquires the service management section 262 whether there is any other subscriber in the multicast group corresponding to the Leave message packet. As a result, if there is any other subscriber in the multicast group, the IGMP/MLD snooping section 253 does not transfer the Leave message packet to the network. Also, the IGMP/MLD snooping section 253 does not cancel the registration of the multicast address and the multicast group identifier in the multicast management table 264.

In this case, the service management section 262 updates the filter information section $271_n$ on the PON interface board $213_n$ via the intra-apparatus filter information control path 265 to cancel the registration for only the subscriber which is requesting for leaving from the multicasting group. Thereby, the filter information tables 258 and 272 for the multicast control board 212 and the PON interface board $213_n$ are updated, and the copying processes performed by the copying section 254 of the multicast control board and the copying section $277_n$ on the PON interface board are changed. However, if any other subscribers, who are participating in the same multicasting group, still exist in the PON interface board $213_n$, the copying process in the multicast control board 212 is not changed, but the number of copying destinations for the multicast data packet in the copying section $277_n$ of the PON interface board $213_n$ decreases.

If there is no other subscriber of the multicast group corresponding to the Leave message packet within the OLT 203, the IGMP/MLD snooping section 253 transfers a Leave message packet to the MC control message/data demultiplexing section 252, and transmits it from the multicast communication section 251 to the network. The router 201 which is the multicast router receiving the Leave message packet via the L2 switch 202 stops sending out the multicast data packet. Also, the IGMP/MLD snooping section 253 cancels the registration of the corresponding multicast address and multicast group identifier in the multicast management table 264.

On the other hand, the service management section 262 on the multicast control board 212 updates the filter information table 258 in the filter information section 255 and updates the filter information section $271_n$ on the PON interface board $213_n$ via the intra-apparatus filter information control path 265 to cancel the registration of the subscriber which is requesting for leaving from the multicasting group. Thereby, the filter information tables 258 and 272 of the multicast control board 212 and the PON interface board $213_n$ are updated, and the copying processes of the copying sections 254, $277_n$ are stopped.

Referring to FIG. 1, a data communication path between the subscriber terminal and the network in the configuration of the optical access network system with the OLT 203 according to this embodiment will be described below.

As will be apparent from the above embodiment, the multicast control message packet or the multicast data packet is transmitted via the following data communication path from the network to the subscriber terminal. This data communication path is via the router 201, the L2 switch 202, the SNI port 221 of the multicast control board 212, the multicast control board 212, the PON interface boards $213_1$, $213_2$, ... and $213_n$, the PON section, and the ONUs $217_{11}$ to $217_{1N}$, $217_{21}$ to $217_{2N}$, ... and $217_{n1}$ to $217_{nN}$ accommodated in the corresponding PON interface boards. This data communication path leads to the OLT 203 via the path 231 as shown in FIG. 1, and via the paths $291_1$ to $291_n$ to the subscriber terminals.

On the other hand, the unicast data packet is transmitted or received via the following data communication path between the network and the subscriber terminal. The data communication path is via the router 201, the L2 switch 202, the SNI ports $222_1$, $222_2$, . . . and $222_n$ on the PON interface boards $213_1$, $213_2$, . . . and $213_n$, the PON interface boards $213_1$, $213_2$, . . . and $213_n$, the PON section, and the ONUs $217_{11}$ to $217_{1N}$, $217_{21}$ to $217_{2N}$, . . . and $217_{n1}$ to $217_{nN}$ accommodated in the corresponding PON interface boards $213_1$, $213_2$, . . . and $213_n$. Thereby, the communication is made between the router 201 and the L2 switch 202 via the path 301 as shown in FIG. 1, and the communication is made between the L2 switch 202 and the OLT 203 via the paths $302_1$, $302_2$, . . . and $302_n$ using the SNI ports of the PON interface boards $213_1$, $213_2$, . . . and $213_n$ provided in the OLT 203.

In this way, in the optical access network system according to this embodiment, the multicast control message packet and the multicast data packet are received via the SNI port 221 which is dedicated for multicasting from the network, multiplexed with the unicast data packet received via other SNI port 222 by the PON interface boards $213_1$, $213_2$, . . . and $213_n$ and transmitted to the subscriber. On the other hand, the unicast data packet transmitted from the subscriber terminal to the network is separated from the multicast related packets by the PON interface board 213, and transmitted via the SNI port 222 corresponding to the PON interface board 213 to the network.

With the optical access network system 200 according to this embodiment as described above, since the multicast service is controlled by using the multicast control board 212, the multicast data can be efficiently distributed to the subscriber. Furthermore, even if the number of subscribers participating in the multicast group increases, or the number of multicast groups increases, the band and quality of the communication for unicast data packets are assured.

Exemplary Embodiment 2

Figure 5:
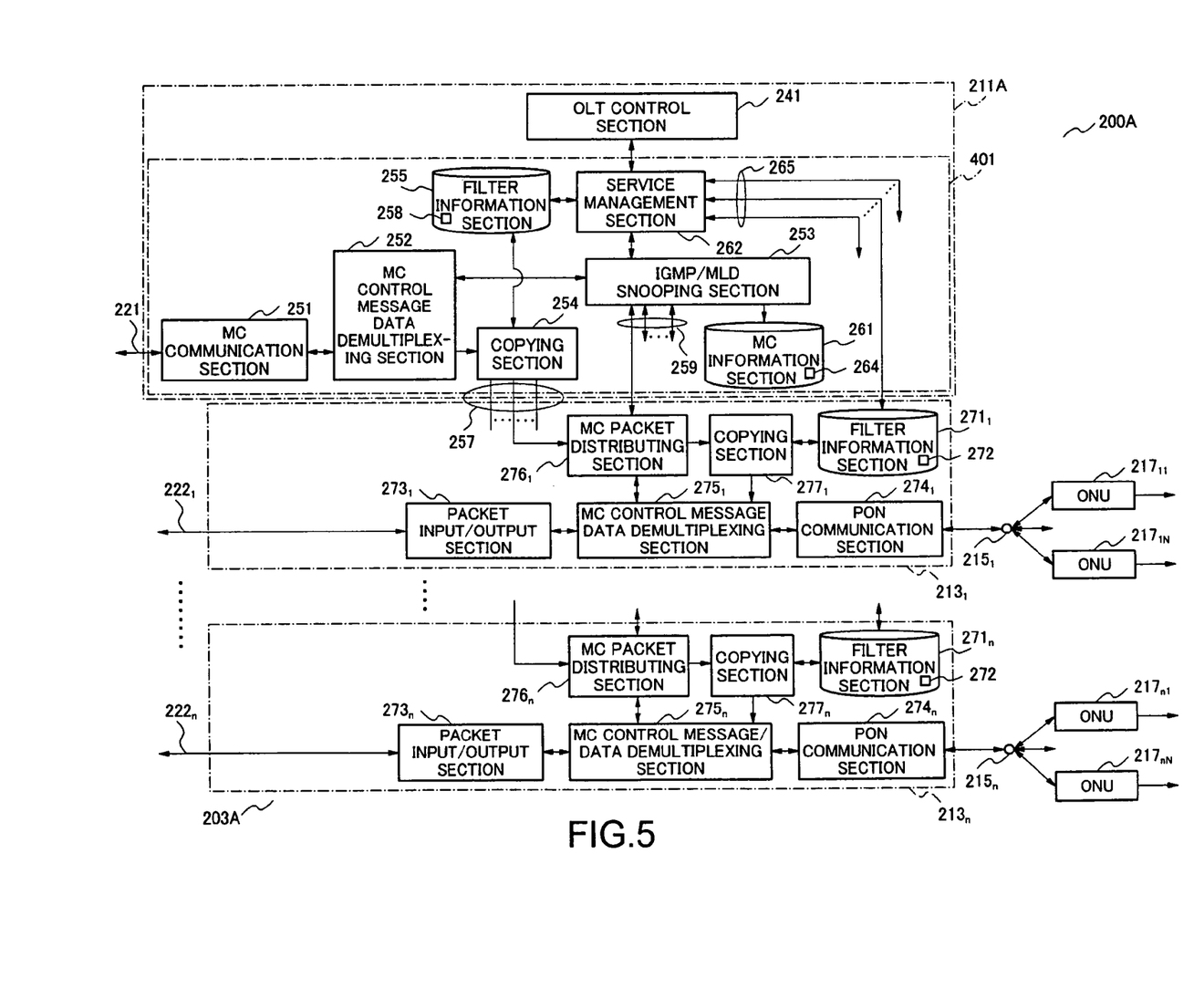
FIG. 5 is a block diagram representing the specific configuration of an OLT and its peripherals according to a second exemplary embodiment of the present invention.

FIG. 5 is a system block diagram representing the specific configuration of an OLT and its peripherals according to a second exemplary embodiment of the present invention. The same parts are given the same numerals throughout FIGS. 2 and 5, and the explanation of the same parts is omitted properly.

In the OLT 203A of the second embodiment, the multicast control board 212 as shown in FIG. 2 is incorporated as a multicast control section 401 into an OLT control board 211A. Though the SNI port 221 dedicated for multicasting is disposed within the multicast control board 212 in the previous embodiment, it exists in the multicast control section 401, which is changed from the multicast control board 212.

In this way, the second embodiment is different in the above two points in the circuit configuration. Accordingly, the operation of the OLT 203A and the optical access network system 200A in the second embodiment is the same as in the previous embodiment.

Thus, in the second embodiment of the present invention, the OLT 203A is constructed by incorporating the multicast control section 401 into the OLT control board 211A. Therefore, if the multicast service is not provided at the time of initial operation of the OLT 203A, the multicast control section 401 is not necessarily incorporated into the OLT control board 211A, and the multicast control section 401 can be added when the multicast service is actually provided.

Thereby, one OLT can make extension depending on the time of providing multicast service, whereby there is the effect that the capital investment of service infrastructure can be effectively planned.

Exemplary Embodiment 3

Figure 6:
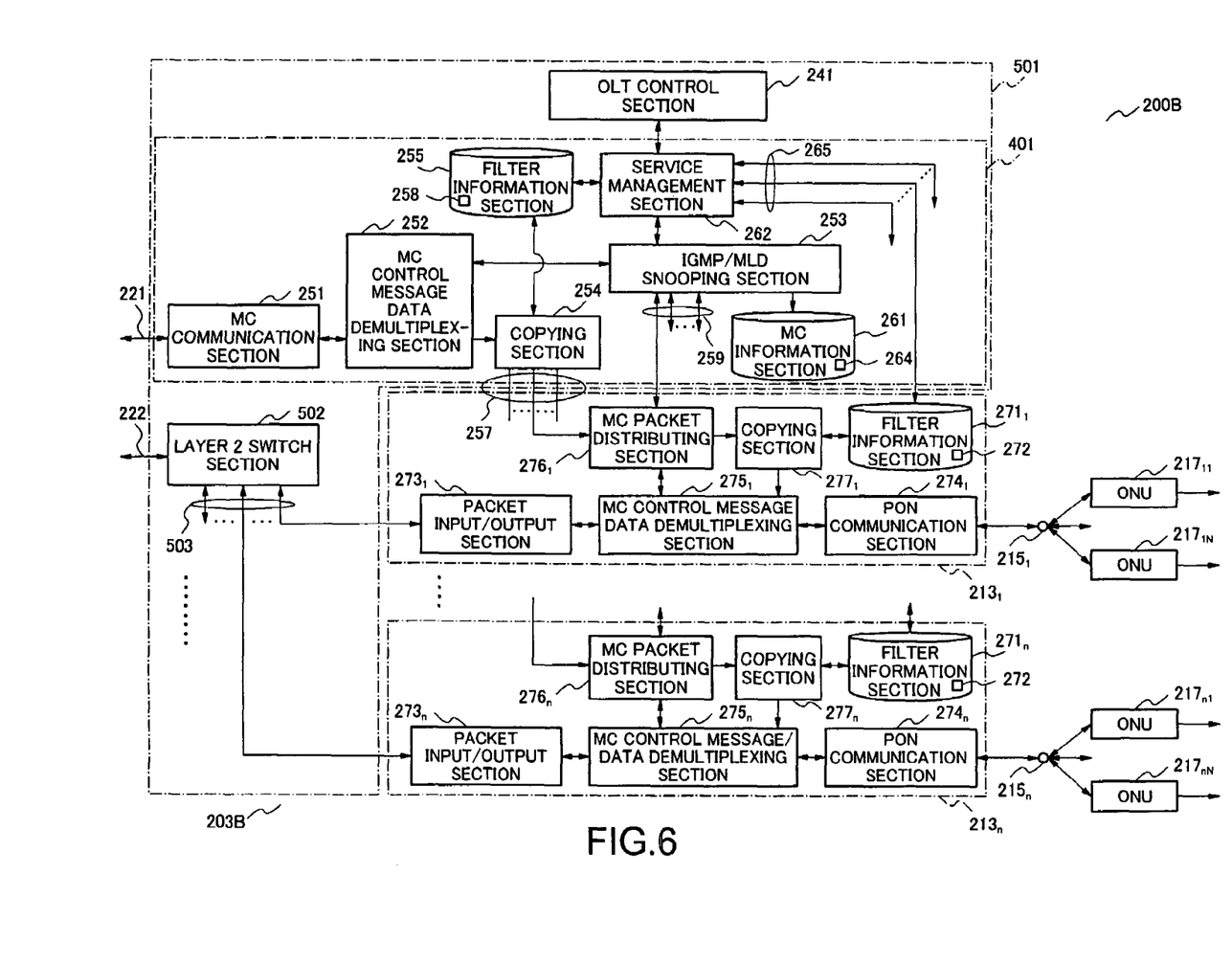
FIG. 6 is a block diagram representing the specific configuration of an OLT and its peripherals according to a third exemplary embodiment of the present invention.

FIG. 6 is a block diagram representing the specific configuration of an OLT and its peripherals according to a third exemplary embodiment of the present invention. The same parts are given the same numerals throughout FIGS. 2 and 6, and the explanation of the same parts is omitted properly.

The OLT 203B of the third embodiment comprises an OLT control multiplexing board 501. The OLT control multiplexing board 501 is different from the first embodiment in that there are provided a layer 2 switch section 502 having a function of universal L2 switch and the multicast control section 401 as shown in the second embodiment of the present invention. Also, the third embodiment is different from the first embodiment in that the SNI ports 222 connecting to the L2 switch 202 arranged in the network as shown in FIG. 1 are integrated in the OLT control multiplexing board 501, and the SNI port 221 dedicated for multicasting is in the multicast control section 401 and connected to the multicast communication section 251.

Herein, the universal L2 switch function of the layer 2 switch section 502 is the function of performing the data distributing control to transfer data to the appropriate ONU 217 in accordance with a general FDB (Forwarding Data Base), not shown, controlled by the L2 switch itself, and transmitting data to the PON interface boards $213_1$, $213_2$, . . . and $213_n$. The detailed operation of the universal L2 switch is well known to those skilled in the art, and the explanation of the layer 2 switch section 502 is omitted.

The operation of the OLT 203B in the optical access network system 200B according to the third embodiment is the same as in the first embodiment. However, the multicast data packet, the multicast control message packet and the unicast data packet are passed through different paths within the OLT 203B. That is, the connection between the L2 switch 202 on the network side and the OLT 203B are made via two ports, the SNI port 221 dedicated for multicast and the SNI port 222. In the embodiment as shown in FIG. 1, the SNI ports $222_1$ to $222_n$ are employed as corresponding to the SNI port 222. In the third embodiment, the unicast data packet is transmitted or received via the SNI port 222 of the layer 2 switch section 502 in the OLT control multiplexing board 501. The unicast data packet received via the SNI port 222 is separated and distributed as data 503 to the respective PON interface boards $213_1$, $213_2$, . . . and $213_n$ by the layer 2 switch section 502. Also, the unicast data packets sent from the PON interface boards $213_1$, $213_2$, . . . and $213_n$ are multiplexed by the layer 2 switch section 502 and transmitted via the SNI port 222.

On the other hand, the SNI port 221 of the third embodiment, like the first and second embodiments, is used to transmit or receive the multicast control message packet and the multicast data packet.

Figure 7:
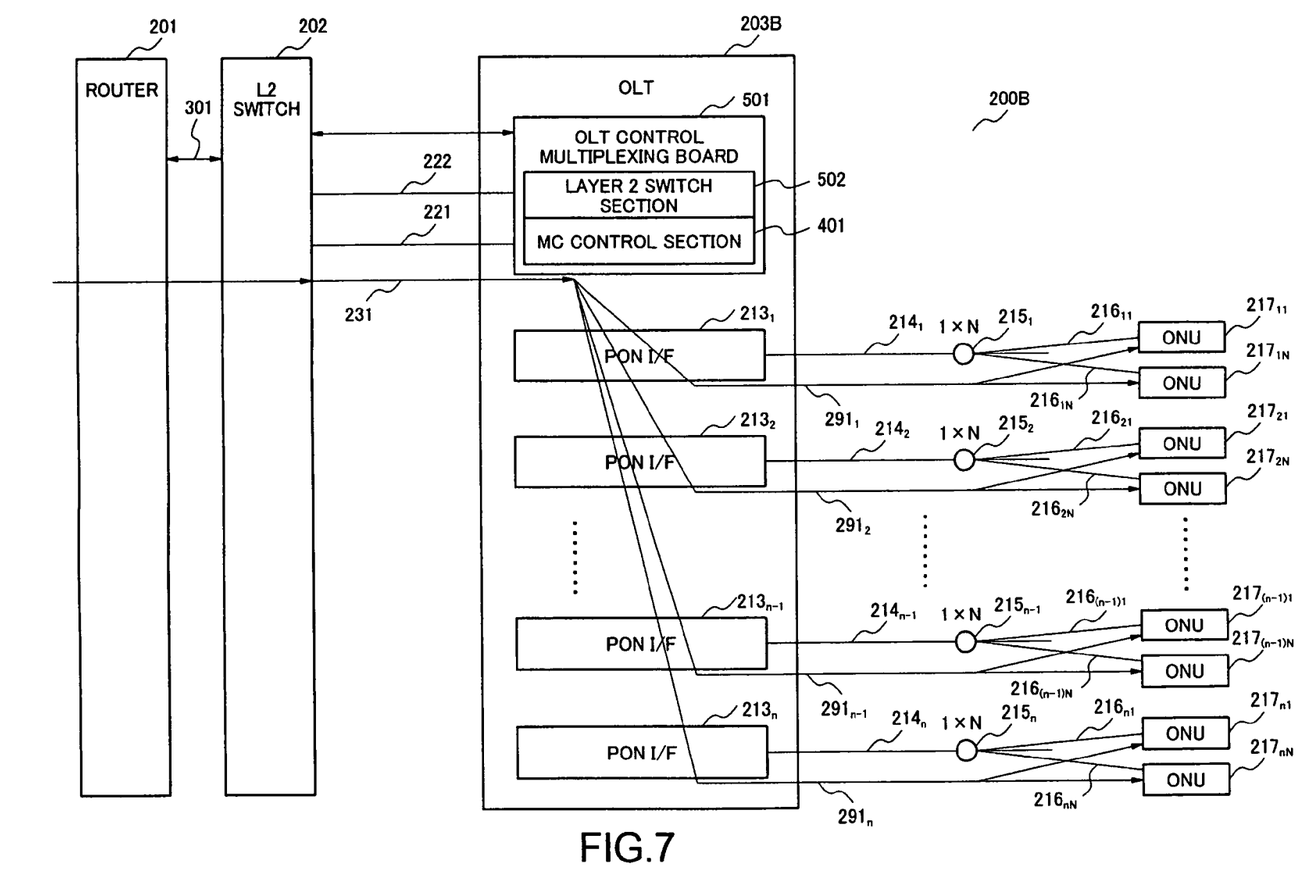
FIG. 7 is an explanatory diagram representing how to transfer the multicast and unicast data in the optical access network system according to the third exemplary embodiment of the present invention.

FIG. 7 is a system block diagram representing how to transfer multicast and unicast data in the optical access network system according to the third exemplary embodiment. The multicast control message packet or multicast data packet leads via the router 201 and the L2 switch 202 through the path 231 to the OLT control multiplexing board 501 of the OLT 203B, and through the paths $291_1$, $291_2$, . . . and $291_n$ to each subscriber terminal (not shown). This is the same as in the first embodiment.

The unicast data packet is communicated through the path 301 between the router 201 and the L2 switch 202. Between the L2 switch 202 and the OLT 203B, the unicast data packet is transmitted or received via the SNI port 222 between the layer 2 switch section 502 within the OLT 203B and the L2 switch 202.

In this way, the OLT 203B according to the third embodiment incorporates the multicast control section 401. Accordingly, the optical access network system 200B is operated without the multicast control section 401 when the optical access network system 200B is initially operated, and the multicast control section 401 can be added when the multicast service is actually provided as described in the second embodiment. Thereby, one OLT 203B can make extension depending on the time of providing multicast service. As a result, there is the effect that the capital investment of service infrastructure can be effectively planned.

Also, in this embodiment, one SNI port 222 is used to transmit or receive the unicast data packet and integrated in the OLT 203B. Thereby, the number of ports required by the L2 switch 202, to which the OLT 203B is connected, can be reduced, so that the construction cost of the network is reduced.

While the multicast data packet is transmitted from the router 201 in this embodiment, any other apparatus (e.g., an apparatus for providing the multicast service arranged between the router and the OLT) may naturally take charge of this role.

While the present invention has been described in connection with certain exemplary embodiments, it is to be understood that the subject matter encompassed by way of the present invention is not to be limited to those specific embodiments. On the contrary, it is intended for the subject matter of the present invention to include all alternative, update, and equivalents as can be included within the spirit and scope of the following claims. Further, the inventers' invention is to retain all equivalents of the claimed invention even if the claims are amended during prosecution.

What is claimed is:

1. An OLT (Optical Line Terminal) provided as a center side network element in an optical access network system which connects a plurality of subscriber terminals to a network, comprising:
    a multicast control unit, which is provided with a multicast communication dedicated port for multicast communication services connected to the network; and
    a plurality of packet data transmission and reception control units for accommodating the plurality of subscriber terminals, each provided with a unicast communication dedicated port for unicast communication services connected to the network;
    wherein the multicast control unit comprises:
        a first filter information table for specifying one or more of the plurality of packet data transmission and reception control units as distribution destinations of the received multicast data packets, wherein the first filter information table contains, for the specified packet data transmission and reception control units, a multicast group identifier corresponding to each of the subscriber terminals accommodated by each of the plurality of packet data transmission and reception control units; and
        a first distribution control section, which identifies each of the packet data transmission and reception control units necessary for distributing the multicast data packets received from the network and distributes the multicast data packets to the respective identified packet data transmission and reception control units; and
    wherein the packet data transmission and reception control unit comprises:
        a second filter information table for specifying one or more of the plurality of subscriber terminals as distribution destinations of the multicast data packets distributed from the multicast control unit, wherein the second filter information table contains the multicast group identifier and the logical link identifier associated with the specified subscriber terminals accommodated by the packet data transmission and reception control unit; and
        a second distribution control section, which identifies each of the subscriber terminals necessary for transmitting the multicast data packets distributed from the multicast control unit, multiplexes the multicast data packets with unicast data packets received via the unicast communication dedicated port, and transmits the multiplexed data packets to the subscriber terminals.

2. The OLT according to claim 1, wherein the first distribution control section further comprising:
    a first copy control section, which extracts the multicast group identifier contained in the multicast data packet received from the network, compares the extracted multicast group identifier with the multicast group identifier contained in the first filter information table, specifies one or more of the plurality of packet data transmission and reception control units as the distribution destinations of the multicast data packet when the multicast group identifier corresponding to the packet data transmission and reception control unit in the first filter information table coincides with the extracted multicast group identifier, copies the received multicast data packets for the respective specified packet data transmission and reception control units.

3. The OLT according to claim 2, wherein the second distribution control section further comprising:
    a second copy control section, which extracts the multicast group identifier contained in the multicast data packet received from the multicast control unit, compares the extracted multicast group identifier with the multicast group identifier contained in the second filter information table, specifies one or more of the plurality of subscriber terminals as the transmission destinations of the multicast data packet when the multicast group identifier corresponding to the subscriber terminal in the second filter information table coincides with the extracted multicast group identifier, copies the received multicast data packets for the respective specified subscriber terminals.

4. The OLT according to claim 3 further comprising:
    a communication control section, which appends the logical link identifier corresponding to the specified subscriber terminal to the multicast data packet, which is copied by the second copy control section, multiplexes the copied multicast data packet with the unicast data packet received from the network via the unicast communication dedicated port, and transmits the multiplexed data packets to the subscriber terminals.

5. The OLT according to claim 4, wherein the communication control section further comprising:
    a packet distributing section, which identifies a type of packet received from the subscriber terminal, transmits the packet via the unicast communication dedicated port to the network if the type of packet is a data packet, and transfers the packet to the multicast control unit if the type of packet is a multicast control message regarding the multicast service; and wherein the multicast control unit further comprising:

a multicast management table, which includes a multicast address of the subscriber terminal group provided with a multicast service and a multicast group identifier corresponding to the multicast address for the multicast service; and a table control section, which controls the update of the contents included in each of the multicast management table, the first filter information table and the second filter information table by referring to the information contained in the multicast control message transferred from the packet distributing section.

6. The OLT according to claim 5, wherein the table control section, when the multicast control message transferred from the packet distributing section contains the request for participating in the multicast service, registers the multicast address and the multicast group identifier corresponding to the multicast service in the multicast management table if unregistered, and updates respective contents of the first filter information table and the second filter information table.

7. The OLT according to claim 5, wherein the table control section, when the multicast control message transferred from the packet distributing section contains the request for participating in the multicast service, updates respective contents of the first filter information table and the second filter information table if the multicast address corresponding to the multicast service has already been registered in the multicast management table.

8. The OLT according to claim 5, wherein the table control section, when the multicast control message transferred from the packet distributing section contains the request for leaving from the participating multicast service, determines whether or not there is any other subscriber terminal belonging to the multicast group corresponding to the multicast service, deletes the multicast address and the multicast group identifier corresponding to the multicast group from the multicast management table if no other subscriber terminal belonging to the multicast group corresponding to the multicast service exists, and updates respective contents of the first filter information table and the second filter information table.

9. The OLT according to claim 5, wherein the table control section, when the multicast control message transferred from the packet distributing section contains the request for leaving from the participating multicast service, determines whether or not there is any other subscriber terminal belonging to the multicast group corresponding to the multicast service, updates respective contents of the first filter information table and the second filter information table if other subscriber terminal belonging to the multicast group corresponding to the multicast service exists.

10. The OLT according to claim 5, further comprising a layer 2 switch section, which is connected with respective unicast communication dedicated ports at one end and connected to the network at the other end, and multiplexes unicast data packets received from each of the packet data transmission and reception control units for transmitting to the network, and distributes the unicast data packets received from the network to respective packet data transmission and reception control units.

11. A multicast communication method in an optical access network system connecting a plurality of subscriber terminals to a network, comprising:

a receiving step, which receives a multicast data packet, at a multicast control unit, from the network via a multicast communication dedicated port connected to the network;

a first distributing step, which identifies one or more of a plurality of packet data transmission and reception control units accommodating the plurality of subscriber terminals that are distribution destinations of the multicast data packet, and distributes the multicast data packets to the respective identified packet data transmission and reception control units, the first distributing step further comprising:

a first referring step, which refers to a first filter information table for specifying packet data transmission and reception control units as distribution destinations of the received multicast data packet, wherein the first filter information table contains, for each specified packet data transmission and reception control unit, a multicast group identifier corresponding to each of the subscriber terminals accommodated by each of the plurality of packet data transmission and reception control units, the first referring step further comprising:

a first extracting step, which extracts the multicast group identifier contained in the multicast data packet received from the network;

a first comparing step, which compares the extracted multicast group identifier with the multicast group identifier contained in the first filter information table; and a first specifying step, which specifies one or more packet data transmission and reception control units as the distribution destinations of the multicast data packets when the multicast group identifier corresponding to the packet data transmission and reception control unit in the first filter information table coincides with the extracted multicast group identifier; and a second distributing step, which receives the distributed multicast data packet at the packet data transmission and reception control unit, identifies every subscriber terminals as transmitting destination, multiplexes the distributed multicast data packets with unicast data packets received via the unicast communication dedicated port, and transmits the multiplexed data packets to the subscriber terminals, the second distributing step further comprising:

a second referring step which refers to a second filter information table for specifying one or more of a plurality of subscriber terminals as transmission destinations of the multicast data packet, wherein the second filter information table contains the multicast group identifier and the logical link identifier associated with each specified subscriber terminal accommodated by the packet data transmission and reception control unit, the second referring step further comprising:

a second extracting step, which extracts the multicast group identifier contained in the multicast data packet received at the packet data transmission and reception control unit;

a second comparing step, which compares the extracted multicast group identifier with the multicast group identifier contained in the second filter information table; and a second specifying step, which specifies each of the subscriber terminals as the distribution destinations of the multicast data packet when the multicast group identifier corresponding to the subscriber terminal in the second filter information table coincides with the extracted multicast group identifier.

12. The multicast communication method according to claim 11, wherein the first distributing step further comprising:

a first copying step, which copies the received multicast data packets and distributes the copied multicast data packets to the respective specified packet data transmission and reception control units; and wherein the second distributing step further comprising:

a second copying step, which copies the received multicast data packet, at the packet data transmission and reception control unit; and a transmitting step, which appends the logical link identifier corresponding to the specified subscriber terminal to the copied multicast data packet for transmission of the copied multicast data packets.

13. The multicast communication method according to claim 12, further comprising:

a packet distributing step, which identifies a type of packet received from the subscriber terminal at the packet data transmission and reception control unit, transmits the packet via a unicast communication dedicated port of the packet data transmission and reception control unit to the network if the type of packet is a data packet, and transfers the packet to the multicast control unit if the type of packet is a multicast control message regarding the multicast service; and a table updating step, which controls updating contents included in a multicast management table, which includes a multicast address of the subscriber terminal group provided with a multicast service and a multicast group identifier corresponding to the multicast address for every multicast service, and the first filter information table and the second filter information table by referring to the information contained in the multicast control message transferred at the packet distributing step.

14. The multicast communication method according to claim 13, wherein the table updating step comprises a first updating step, which updates, when the multicast control message contains the request for participating in the multicast service, the multicast management table by registering the multicast address and the multicast group identifier corresponding to the multicast service if unregistered, and updates respective contents of the first filter information table and the second filter information table.

15. The multicast communication method according to claim 13, wherein the table updating step comprises a second updating step, which updates, when the multicast control message contains the request for participating in the multicast service, respective contents of the first filter information table and the second filter information table if the multicast address corresponding to the multicast service has already been registered in the multicast management table.

16. The multicast communication method according to claim 13, wherein the table updating step comprises a third updating step, which determines, when the multicast control message contains the request for leaving from the participating multicast service, whether or not there is any other subscriber terminal belonging to the multicast group corresponding to the multicast service, deletes the multicast address and the multicast group identifier corresponding to the multicast group from the multicast management table if no other subscriber terminal belonging to the multicast group corresponding to the multicast service exists, and updates respective contents of the first filter information table and the second filter information table.

* * * * *